March 15, 1966 W. STELZER 3,240,534
TRACTOR TRAILER BRAKE SYSTEM
Filed Jan. 9, 1963 2 Sheets-Sheet 1
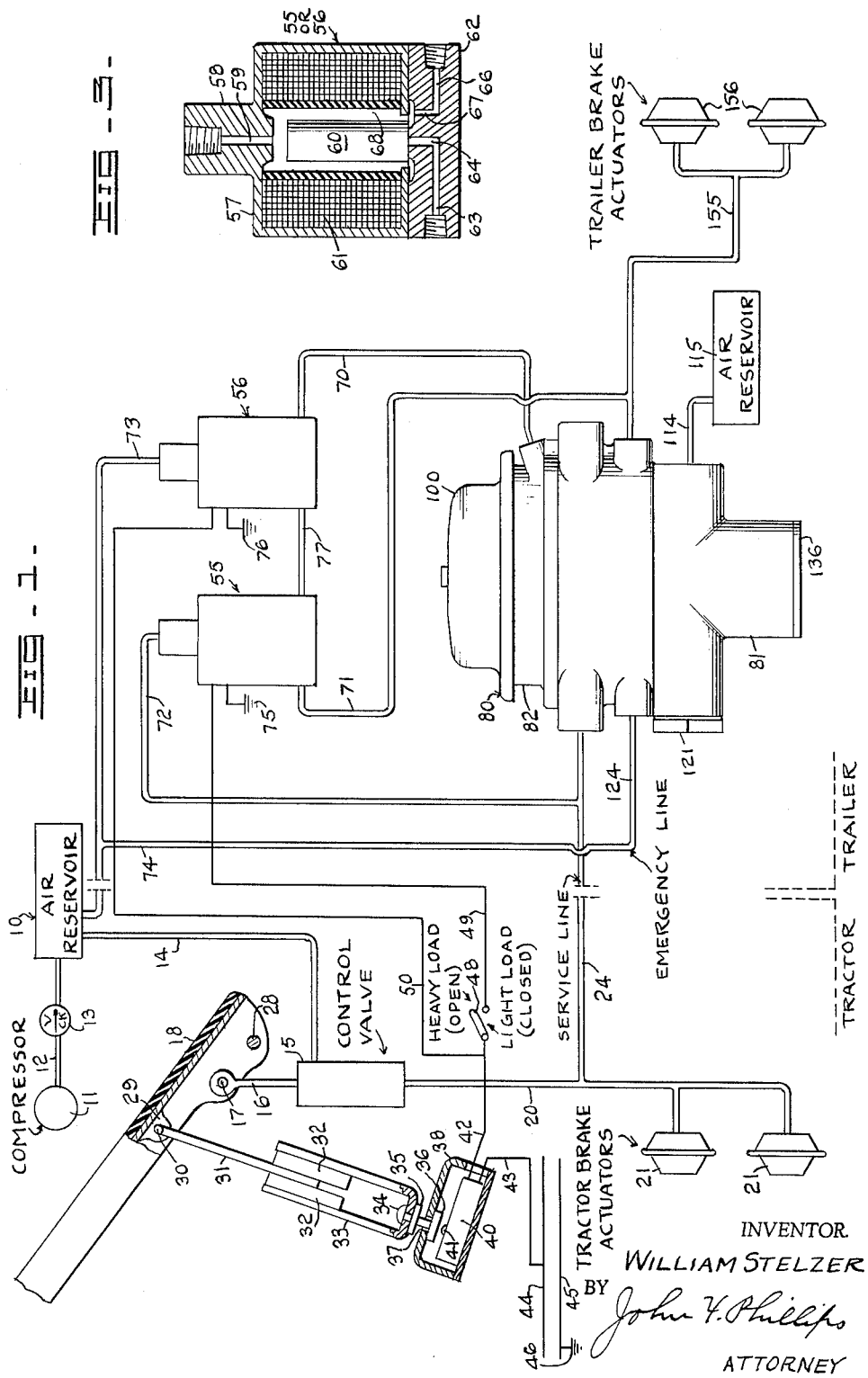
INVENTOR.
WILLIAM STELZER
BY John V. Phillips
ATTORNEY March 15, 1966  W. STELZER  3,240,534
TRACTOR TRAILER BRAKE SYSTEM
Filed Jan. 9, 1963  2 Sheets-Sheet 2
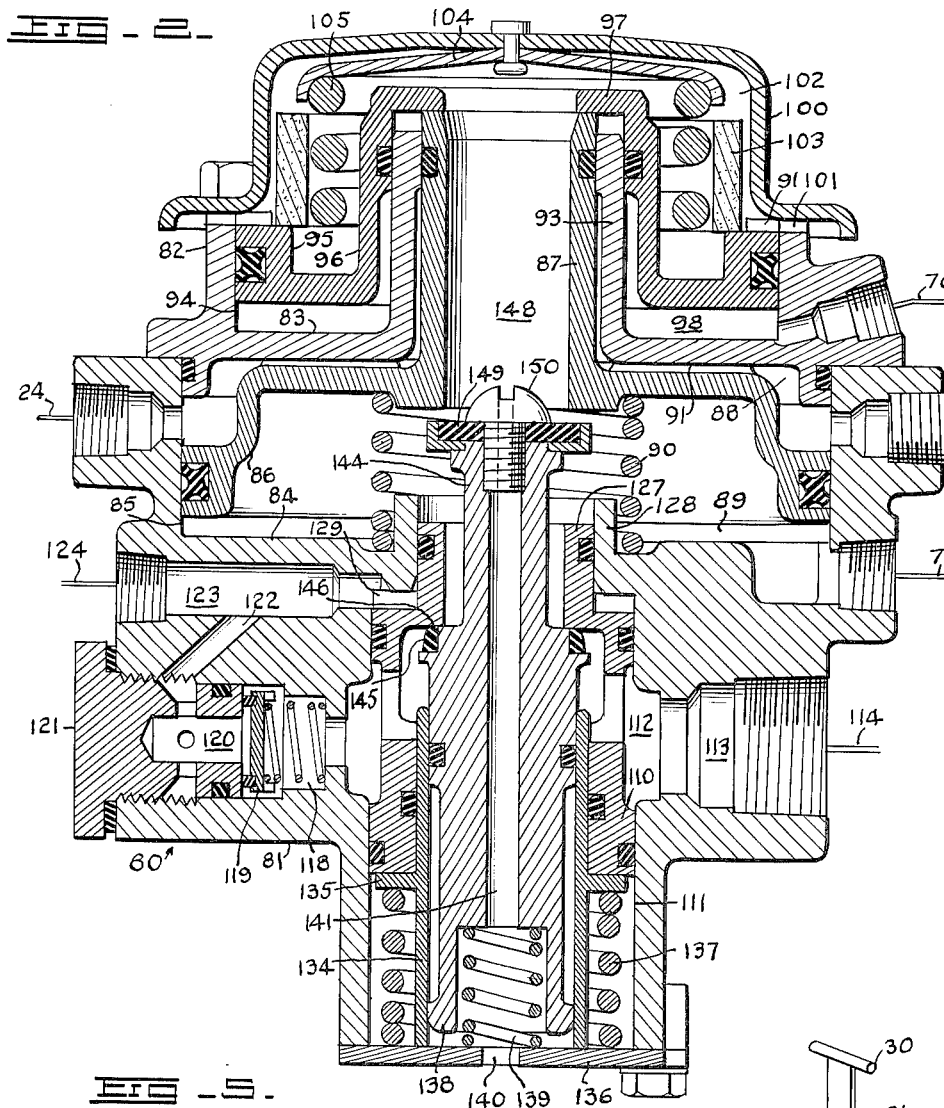
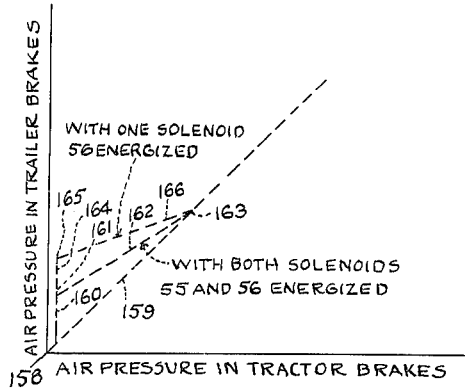
INVENTOR.
WILLIAM STELZER
BY John F. Phillips
ATTORNEY 3,240,534
TRACTOR TRAILER BRAKE SYSTEM
William Stelzer, Bloomfield Hills, Mich., assignor to Kelsey-Hayes Company, Romulus, Mich., a corporation of Delaware
Filed Jan. 9, 1963, Ser. No. 250,370
10 Claims. (Cl. 303—15)

This invention relates to trailer brake systems and particularly to relay valves for trailers equipped with air brakes and has special reference to an emergency relay valve adapted to provide lead brakes for the trailer and to speed up the trailer application relative to the tractor brakes to minimize jack-knifing.

An important object of the invention is to provide an emergency relay valve for trailers which incorporates therein means to provide lead braking of the trailer wheels as distinguished from prior constructions wherein separate mechanisms are employed in conjunction with relay valves to effect application of the trailer brakes ahead of the tractor brakes, thereby producing a more compact, faster operating and less expensive unit.

A further object is to provide a novel electric switch for controlling the circuit or circuits referred to wherein frictional switch operating means effects the closing of the switch immediately upon initial depression of the brake pedal while permitting the latter to move through its full travel without affecting the switch, and wherein the friction means, upon initial retractile movement of the brake treadle, releases the switch to release the trailer brakes.

A further object is to provide a mechanism of the character referred to having novel selective switch means operable by the brake treadle on the tractor to close a control circuit for control lines leading to the novel emergency relay valve, the switch mechanism being such that the circuit is broken immediately upon initial retractile movement of the treadle, regardless of how far the treadle has been moved in applying the brakes.

A further object is to provide pressure operated means embodied as a part of the emergency relay valve for effecting a fast application of the trailer brakes relative to the tractor brakes, and to provide novel pedal controlled means for governing the pressures in the emergency relay valve in accordance with the load on the trailer to pre-determine the extent of the initial application of the trailer brakes.

Other objects and advantages of the invention will become apparent during the course of the following description.

In the drawings I have shown one embodiment of the invention. In this showing—

FIGURE 1 is a diagrammatic view of the system as a whole, parts being structurally represented and parts being broken away;

FIGURE 2 is a vertical axial sectional view through the novel relay valve mechanism;

FIGURE 3 is a sectional view through one of the control solenoids;

FIGURE 4 is a perspective view of a friction plate associated with the switch operating mechanism; and FIGURE 5 is a graphic representation of the application of the tractor and trailer brakes under different conditions.

Referring to FIGURE 1, the numeral 10 designates an air reservoir on the tractor supplied with super-atmospheric pressure from a compressor 11 through a line 12 in which is arranged a check valve 13. The reservoir 10 is connected by a duct 14 to a conventional control valve 15 operated by a push rod 16 pivoted as at 17 to the treadle 18 on the tractor through which the brakes are controlled. Lines 20 connect the control valve 15 to conventional tractor brake actuators 21. The line 20 normally is connected to the atmosphere through the control valve 15 and the latter is of the conventional type which operates upon initial depression of the treadle 18 to cut off the line 20 from the atmosphere and connect it to the line 14. The valve mechanism 15 usually will be of the follow-up type to admit pressure from the line 14 to the line 20 in accordance with the extent of operation of the treadle 18. A service line 24 is connected at its forward end to the line 20 and will be further described below.

The treadle 18 is mounted to rock on a pivot pin 28 rearwardly of the pin 17. Forwardly of the latter pivot pin, the bottom of the treadle is provided with ears 29 receiving trunnions 30 carried by the upper end of a plate 31, the lower end of which is widened as shown in FIGURE 4. The plate 31 slides between friction plates 32 carried by the respective arms of a yoke 33 which operates to maintain frictional engagement between the plate 31 and shoes 32.

The base of the yoke 33 is provided with a pin 34 having a head 35 fixed against the bottom of the yoke, and spaced below the head 35 is a switch operating head 36 carried by the pin 34 which projects freely through an opening 37 in a housing 38. A micro-switch 40 is arranged in the housing 38 and is provided with a button 41 normally spaced from the top of the housing 38. Two wires 42 and 43 lead from the switch 40. The wire 43 is connected to one of the 12-volt wires 44 and 45 of the tractor, and the wire 45 is shown as being grounded as at 46. The wire 42 leads to a normally open switch 48 adapted to be closed to connect the wire 42 to a wire 49 further referred to below. A wire 50 is tapped at one end into the wire 42 between the switches 40 and 48 for a purpose to be described.

Connected in the system are two solenoid valves respectively indicated as a whole by the numerals 55 and 56. These solenoid valves are identical and one has been illustrated in FIGURE 3. The casing 57 of each solenoid valve device has an upper boss 58 provided with a passage 59 therethrough, at the lower end of which is formed a seat engageable by the armature 60 of the solenoid when the latter is energized by passing current through the coil 61 thereof. Each solenoid is provided with a base 62 having a passage 63 the inner end of which extends upwardly as at 64 axially of the solenoid and normally engaged by the solenoid 60 so that the passage 63 is normally closed. The base of each solenoid is further provided with a passage 66 the inner end of which extends upwardly as at 67 to communicate with the air space 68 around the armature 60 and normally communicating with the passage 59. The passage 66 of the solenoid device 56 is connected to one end of a fluid line 70 (FIGURE 1) further referred to below. The passage 63 of the solenoid device 55 is connected to one end of a fluid line 71, the purpose of which is also described below. The passage 59 of the solenoid 55 is connected to one end of a line 72, the other end of which is tapped into the service line 24. The passage 59 of the solenoid 56 is connected to one end of a line 73, and the other end of this line is tapped into an emergency line 74, one end of which is connected to the air reservoir 10. The wires 49 and 50 are connected to the coils 61 of the respective solenoid devices 55 and 56 and these coils are respectively grounded as at 75 and 76. The passage 66 of the solenoid 55 is connected by a line 77 to the passage 63 of solenoid 56.

The mechanism forming the principal subject matter of the present invention is shown in detail in FIGURE 2 of the drawings. The relay valve device is indicated as a whole by the numeral 80 and comprises a main lower body portion 81 and an upper body portion 82 fixed together in any suitable manner. The body 82 is provided with a lower wall 83, and spaced therefrom, the body 81 is provided with a horizontal wall 84. Between these walls the body 81 is formed as a cylinder 85 in which is slidable a piston 86 in sealed engagement with the cylinder and provided with an upwardly extending axial tubular portion 87. The piston provides thereabove and therebelow respective chambers 88 and 89, and in the latter chamber is arranged a spring 90 biasing the piston 86 upwardly to its limit of movement shown in FIGURE 2, such movement being limited by bosses 91.

The central portion of the wall 83 is provided with an upwardly extending sleeve 93 in which the sleeve portion 87 is vertically slidable in sealed relation as shown. The upper portion of the body 82 is formed as a cylinder 94 in which is slidable in sealed relation therewith a piston 95 having a concentric upwardly extending integral sleeve 96 in sealed sliding engagement with the outside of the sleeve 93 and provided at its upper end with an inwardly extending integral flange 97 normally contacting with the upper end of the sleeve 87. The space beneath the piston 95 forms a chamber 98.

The upper body member 82 is provided with a cap 100 secured in position in any suitable manner and seating against upwardly extending lugs 101 providing therebetween spaces whereby the chamber 102 within the cap 100 is always open to the atmosphere. Within the cap 100 is arranged an air muffler 103. An upper spring seat 104 is loosely fixed to the cap 100 and is engaged by the upper end of a spring 105 the lower end of which seats on ribs formed integral with the piston 95, thus biasing the piston 95 downwardly. This biasing effect is normally overcome by fluid pressure as described below.

A vertically movable sleeve 110 is slidable in a bore 111 formed in the body 81 and this member and the body 81 combine to form a chamber 112 communicating through a port 113 with a line 114 leading to an air reservoir 115 (FIGURE 1). The chamber 112 (FIGURE 2) also communicates with a chamber 118 in which is arranged a spring-pressed valve 119 normally closing communication between the chamber 118 and a passage 120 in a plug 121, this passage communicating through a passage 122 with a radial chamber 123 formed in the body 81 and communicating through a line 124 with the emergency line 74.

The member 110 is provided with a reduced upper end 127 in sealed sliding engagement with a cylinder 128 formed integral with the body 81. The member 110 forms with the bore 111 a chamber 129 communicating with the radial passage 123.

A sleeve 134 has its upper end slidable in sealed relation with the lower end of the member 110, and the bottom of the latter member seats on a flange 135 formed integral with the sleeve 134. This sleeve has its lower end seated on a closure plate 136 fixed to the bottom of the housing 81, and a spring 137 is arranged between this plate and the flange 135. A piston 138 is slidable in the sleeve 134 and is biased upwardly by a spring 139. The plate 136 is open to the atmosphere as at 140 and the piston 138 is bored as at 141 to be open to the atmosphere throughout its length through the opening 140.

The piston 138 has a reduced upper end 144 forming with the lower end of the piston the shoulder surrounded by a valve 145 engaging the shoulder 146 formed at the lower end of the reduced upper end 127 of the member 110. This valve normally closes communication between the chambers 89 and 112.

As stated, the portion 87 of the piston 86 is formed as a sleeve and accordingly is provided with a passage 148 therethrough normally communicating with the atmospheric chamber 102 and the chamber 89 so that the latter is normally open to the atmosphere. A valve 149 is fixed to the upper end of the piston 138 by a screw 150 which may be bored as indicated in dotted lines so that the bore 141 and passage 148 are in open communication with each other.

The air reservoir 115 (FIGURE 1) obviously is charged with pressure through the line 74. A line 155 connects the line 71 to conventional trailer brake actuators 156.

In FIGURE 5 there is graphically represented braking pressures delivered to the tractor and trailer brake actuators under different conditions. The actuators are at atmospheric pressure normally as indicated by the point 158 in FIGURE 5. As the brake treadle is progressively depressed, pressure in the tractor brake actuators 21 will increase progressively as indicated by the numeral 159. However, the trailer brake actuators have the pressure therein built up rather abruptly as indicated at 160. Assuming that the switch 48 is closed for a light load, as explained below, the abrupt building up of pressure in the trailer brakes is arrested at the point 161. Thereafter, pressure in the trailer brake actuators increases at a lower rate as indicated by the line 162 until this line meets the line 159 as at 163. Up to this point, the trailer brake actuators 156 will have been subjected to higher pressures than the tractor brake actuators 21, thus providing a substantial trailer brake snubbing action to prevent jack-knifing. From the point 163 on, due to the functioning of the valve mechanism 80, the tractor and trailer brake actuators will be equally subjected to pressures as indicated by the continuation of the line 159 beyond the point 163. Assuming that the switch 48 is open for a heavy load, the abrupt increase in pressure indicated by the line 160 will continue as at 164 up to the point 165, after which pressures in the trailer brakes will continue to increase but at a lower rate, as indicated by the line 166 until the point 163 is reached, after which the tractor and trailer brakes will be energized to the same extent.

*Operation*

The parts normally occupy the positions shown in FIGURE 1 with respect to the treadle 18 and switch-operating mechanism, and in FIGURES 2 and 3. The emergency line connection 124 supplies pressure at all times to the passages 123 and 122. The check valve 119 remains seated since the chamber 112 is connected by the line 114 to the reservoir 115. This check valve opens only if pressure in the reservoir 115 drops below the emergency line pressure, in which case the check valve 119 opens so as to maintain a supply of air under pressure to the chamber 112. With the brakes released, the service line 24 is under atmospheric pressure and the same will be true of the chamber 88 (FIGURE 2). Also, the chamber 89 will be at atmospheric pressure since the valve 149 will be open. Since the armature of the solenoid 56 will be in its lowermost position (FIGURE 3), the pressure line 73 will supply pressure through passage 59, chamber 68, passage 66 and line 70 to the chamber 98. This pressure, normally present in the chamber 98, maintains the spring 105 compressed so that the piston 86 is in its uppermost position with the valve 149 open.

When the brakes are to be operated, the treadle 18 is depressed and frictional engagement between the plate 31 and shoes 32 moves the yoke 33 downwardly so that the head 36 closes the micro-switch. Assuming that the switch 48 is open, a circuit will be closed through wire 50, the coil of solenoid 56 and to ground 76. The armature 60 (FIGURE 3) will move upwardly to close the passage 59 and open the passage 63 of the solenoid 56. Under such conditions, the chamber 98, previously maintained under pressure from the line 73, will be reduced to atmospheric pressure by the flow of air through the line 70, passages 66 and 63 of solenoid 56, line 77, passages 66 and 59 of solenoid 55 and line 72, leading to the service line 24 which is under atmospheric pressure.

The relieving of pressure from the chamber 98 releases the spring 105 to move the piston 95 downwardly, and the flange 97 of the piston 95 moves the sleeve 87 and piston 86 downwardly. The lower end of the sleeve 87 engages the valve 149, thus disconnecting the chamber 89 from the atmosphere. Further downward movement of the sleeve 87 moves the piston 138 downwardly to crack the valve 145, thus allowing pressure to flow from the chamber 112 into the chamber 89 and thus through lines 71 and 155 to the trailer brake actuators to set the trailer brakes. This causes a rise in pressure in the trailer brakes as indicated by the line 160 in FIGURE 5, and this action takes place before appreciable pressure is supplied to the tractor brake actuators upon initial operation of the control valve mechanism 15 by operation of the treadle. When pressure in the chamber 89 balances the force of the spring 105, slight upward movement of the pistons 86 and 138 will close the valve 145 while the valve 149 remains in lap position. The modulated initial pressure in the chamber 89 is sufficient to set the trailer brakes and to provide a snubbing action in a loaded trailer.

If the brake treadle is further depressed, control pressure transmitted through the service line 24 to the chamber 88 (FIGURE 2) will exert a downward force on the piston 86, assisting the spring 105 to cause the production of a higher pressure in the chamber 89. The increased pressure transmitted to the trailer brakes is indicated by the line 166 in FIGURE 5. The service line pressure is also transmitted to the chamber 98 through the same paths through which pressure was previously released from this chamber. The service line pressure increase in the chamber 98 opposes the spring 105 with progressively increasing force, so that at the point 163 (FIGURE 5) the force of the spring 105 is cancelled out. From such point on, service line pressure in the chamber 88 controls the piston 86, opposed by pressure in the chamber 89. These opposing pressures provide a modulated action in accordance with which the tractor and trailer brake pressures are the same as indicated by the extension of the line 159 beyond the point 163.

It will be apparent that the frictional engagement between the plate 31 and friction shoes 32 results in the closing of the switch 40 immediately upon initial depression of the treadle 18. Regardless of the extent to which the treadle 18 has been moved in a brake application, initial return movement of this treadle for releasing the brakes will transmit a force from plate 31 to the yoke 33 to release the switch 40, the treadle 18 then returning fully to its inoperative position with the plate 31 sliding between the friction shoes 32. The releasing of the switch 40 de-energizes the solenoid 56, thus restoring normal pressure conditions to the various chambers of the valve mechanism 80 as described above.

If the switch 48 is closed for a light load or when the trailer is empty, both solenoids will be energized through the parallel circuits provided by the wires 49 and 50. In this case, upon operation of the treadle 18, both armatures 60 of the two solenoids will move upwardly to close the respective passages 59 of the solenoids, and the line 70 will communicate through passages 66 and 63 of solenoid 56, line 77, the same passages of solenoid 55, and through line 71 with the chamber 89. The drop in pressure thus occurring in the chamber 98 will release the spring 105 to close the valve 149 and open the valve 145, thus admitting pressure into the chamber 89. This pressure is immediately transmitted through the lines of communication just described to the chamber 98 to oppose the spring 105 so that a lower initial pressure results in the chamber 89, but which pressure increases with increasing pressure in the service line 24, communicated to the chamber 88 and acting downwardly on the piston 86. With both solenoids energized, therefore, there will be an immediate increase in pressure in the trailer brake actuators, transmitted from the chamber 89 until the point 161 is reached, and as service line pressure increases, trailer brake actuator pressures will increase as indicated by the line 162 until the point 163 is reached. Beyond this point, as when the trailer is heavily loaded, tractor and trailer brake pressures will be equal as indicated by the extension of the line 159 beyond the point 163.

It will be noted that pressure in the chamber 129 acts downwardly on the sleeve of piston 110 to maintain it seated on the stop shoulder 135. If such air pressure becomes dangerously low, the spring 137 pushes the piston 110 upwardly, allowing spring 139 to move the piston 138 upwardly to close the valve 149, and subsequently to open the valve 146. This will supply pressure from the chamber 112 to the chamber 89 to apply the brakes with the full power that is available in the air reservoir 115. The check valve 119 permits air from the emergency line 124 to flow into the chamber 112 but prevents loss of pressure from the reservoir 115 if pressure in the emergency line fails.

From the foregoing, it will be apparent that the present construction combines as a part of the emergency relay valve, mechanisms previously employed for causing trailer brake actuation ahead of tractor brake actuation upon initial operation of the tractor brake treadle. Thus, the mechanism is more economical to manufacture and is substantially simplified in its functioning for the purpose stated.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A tractor trailer brake system comprising brake actuators on the tractor, brake actuators on the trailer, a manually operable valve on the tractor for connecting said tractor brake actuators to a source of pressure, and a relay valve mechanism on the trailer comprising a housing having a first chamber connected to said control valve, a second chamber directly connected to said trailer brake actuators, a pressure movable member dividing said chambers, spring means biasing said pressure movable member for movement in one direction, a control chamber, means for maintaining pressure in said control chamber to normally overcome said spring means, means operable upon operation of said manually operable valve for relieving pressure in said control chamber to release said spring means, means operable upon said movement of said pressure movable member by said spring means for admitting pressure from said source to said second chamber and thus to said trailer brake actuators, increasing pressure in said second chamber acting against said spring means to overcome the latter when pressure in said second chamber reaches a predetermined point to cut off the admission of pressure to said second chamber, and means operative upon a decrease in pressure available in said source for supplying all of such available pressure to said second chamber.

2. A tractor trailer brake system comprising brake actuators on the tractor, brake actuators on the trailer, a manually operable valve on the tractor for connecting said tractor brake actuators to a source of pressure, and a relay valve mechanism on the trailer comprising a housing having a first chamber connected to said control valve, a second chamber directly connected to said trailer brake actuators, a pressure movable member dividing said chambers, spring means biasing said pressure movable member for movement in one direction, a control chamber, means for maintaining pressure in said control chamber to normally overcome said spring means, means operable upon operation of said manually operable valve for relieving pressure in said control chamber to release said spring means, means operable upon said movement of said pressure movable member by said spring means for admitting pressure from said source to said second chamber and thus to said trailer brake actuators, increasing pressure in said second chamber acting against said spring means to overcome the latter when pressure in said second chamber reaches a predetermined point to cut off the admission of pressure to said second chamber, means for predetermining the pressure in said second chamber at which pressure supplied thereto will be cut off and means operative upon a decrease in pressure available in said source for supplying all of such available pressure to said second chamber.

3. A tractor trailer brake system comprising brake actuators on the tractor, brake actuators on the trailer, a manually operable valve on the tractor for connecting said tractor brake actuators to a source of pressure, and a relay valve mechanism on the trailer comprising a housing having a first chamber connected to said control valve, a second chamber directly connected to said trailer brake actuators, a pressure movable member dividing said chambers, a control chamber in said housing, a piston forming one wall of said control chamber and having mechanical engagement with said pressure movable member, a spring engaging said piston to urge it and said pressure movable member in one direction, means normally maintaining pressure in said control chamber to immobilize said spring, means for releasing pressure from said control chamber to release said spring for effecting said movement of said pressure movable member, means operative upon said movement of said pressure movable member for admitting pressure from said source to said second chamber and thus to said trailer brake actuators, pressure increases in said second chamber acting through said mechanical connection to move said piston and compress said spring when pressures in said second chamber increase to a predetermined point to cut off the admission of pressure to said second chamber, and means operative upon a decrease in pressure available in said source for supplying all of such available pressure to said second chamber.

4. A system according to claim 3 provided with means for controlling the predetermined pressure in said second chamber at which said spring will be compressed and the admission of pressure to said second chamber will be cut off.

5. A tractor trailer brake system comprising brake actuators on the tractor, brake actuators on the trailer, a manually operable valve on the tractor for connecting said tractor brake actuators to a source of pressure, and a relay valve mechanism on the trailer comprising a housing having a first chamber connected to said control valve, a second chamber directly connected to said trailer brake actuators, a pressure movable member dividing said chambers, said manually operable valve normally connecting said first chamber to the atmosphere, a valve body, a normally open air valve carried by said valve body for normally connecting said second chamber to the atmosphere, an inlet chamber connected to a source of pressure, a normally closed inlet valve carried by said valve body for controlling communication between said inlet chamber and said second chamber, said housing being provided with a control chamber, a piston forming one wall of said control chamber and having mechanical engagement with said pressure movable member, a spring engaging said piston and biasing it and said pressure movable member in one direction to close said air valve and open said inlet valve, means normally maintaining pressure in said control chamber to immobilize said spring, means for releasing pressure from said control chamber to release said spring to move said pressure movable member to close said air valve and open said inlet valve to admit pressure to said second chamber, pressure in said second chamber opposing movement of said pressure movable member and being operable when such pressure increases to a predetermined point for compressing said spring and moving said pressure movable member a sufficient distance to at least close said inlet valve and cut off the admission of pressure to said second chamber, and means operative upon a decrease in pressure available in said source for supplying all of such available pressure to said second chamber.

6. A system according to claim 5 provided with means for controlling the pressure in said control chamber whereby such pressure acts against said piston in cooperation with pressure in said second chamber to predetermine the pressure in the latter at which said spring will be overcome.

7. A tractor trailer brake system comprising brake actuators for the tractor, brake actuators on the trailer, a manually operable valve on the tractor, a treadle for operating said valve, a service line connected to said control valve and to said tractor brake actuators, said control valve normally connecting said service line to the atmosphere and being operative for connecting said service line to a source of pressure, and a relay valve mechanism on the trailer comprising a housing having a first chamber connected to said service line, a second chamber directly connected to said trailer brake actuators, a pressure movable member dividing said chambers, a control chamber, a piston forming one wall of said control chamber and having mechanical engagement with said pressure movable member, a pair of electro-magnetic devices normally connecting said control chamber to a source of pressure, a spring biasing said piston to move it and said pressure movable member in one direction, said spring being normally compressed by pressure in said control chamber, a valve body, a normally open air valve affording communication between said second chamber and the atmosphere, an inlet chamber connected to a pressure source, a normally closed inlet valve carried by said valve body between said inlet chamber and said second chamber, means for selectively operating said electro-magnetic devices to connect said control chamber to said service line, to release pressure in said control chamber whereby said spring moves said pressure movable member to close said air valve and open said inlet valve, said means for selectively operating said electro-magnetic devices being operable for connecting said control chamber to said inlet chamber, such means for selectively operating said electro-magnetic devices predetermining the pressure in said second chamber necessary for moving said pressure movable member against said spring a sufficient distance to at least close said inlet valve, and means operative upon a decrease in pressure available in said source for supplying all of such available pressure to said second chamber.

8. A system according to claim 7 wherein said electro-magnetic devices comprise a pair of solenoid valves one of which normally connects said control chamber to a pressure source, a branch line connecting said devices, the other solenoid valve normally connecting said branch line to said service line, said means for selectively operating said electro-magnetic devices comprising a main switch connected to said treadle and operable upon initial movement of said treadle for closing a circuit through said one solenoid valve device to open communication between said control chamber and said branch line and thus open the latter to said service line, and a normally open manually operable switch in series with said main switch and said other solenoid whereby when said manually operable switch is closed, said other solenoid will be energized to connect said branch line to said inlet chamber.

9. A system according to claim 8 wherein said main switch comprises a switch device, an operating member for closing said switch device, and frictional means connecting said treadle to said operating member whereby initial movement of said treadle closes said main switch after which point, said treadle is further movable, and whereby upon initial retractile movement of said treadle, said switch device will be opened and said treadle may continue its movement back to a normal position.

10. A system according to claim 8 wherein said main switch comprises a switch device, a yoke having an operating head movable to close said switch device, friction shoes between the arms of said yoke, and a friction plate connected to said treadle and operating frictionally between said shoes.

References Cited by the Examiner

UNITED STATES PATENTS 2,941,844   6/1960   Stelzer _____ 303—7
2,997,565   8/1961   Frachon _____ 200—153.19

FOREIGN PATENTS 1,178,386   12/1958   France.

EUGENE G. BOTZ, *Primary Examiner.*